(12) United States Patent
Nakabayashi

(10) Patent No.: US 6,301,259 B1
(45) Date of Patent: Oct. 9, 2001

(54) SWITCH AND SWITCHING METHOD

(75) Inventor: Takeo Nakabayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/946,195

(22) Filed: Oct. 7, 1997

(30) Foreign Application Priority Data

May 26, 1997 (JP) .......................................... 134877
May 27, 1997 (JP) ....................................... 9-136693

(51) Int. Cl.$^7$ ................................................ H04L 12/56
(52) U.S. Cl. ........................................... 370/413; 370/329
(58) Field of Search ...................... 370/389, 398, 370/399, 412, 422, 413, 395, 428

(56) References Cited

U.S. PATENT DOCUMENTS

| | | | |
|---|---|---|---|
| 5,448,564 | * 9/1995 | Thor | 370/392 |
| 5,459,723 | 10/1995 | Thor . | |
| 5,533,017 | * 7/1996 | Thor | 370/419 |
| 5,557,610 | * 9/1996 | Calamvokis et al. | 370/60.1 |
| 5,610,914 | * 3/1997 | Yamada | 370/395 |
| 5,612,952 | * 3/1997 | Motoyama | 370/412 |
| 5,701,292 | * 12/1997 | Chiussi et al. | 370/232 |
| 5,710,770 | * 1/1998 | Kozaki et al. | 370/368 |
| 5,864,553 | * 1/1999 | Aramaki | 370/392 |

FOREIGN PATENT DOCUMENTS 1-503746   12/1989   (JP) .

* cited by examiner

*Primary Examiner*—Hassan Kizou
*Assistant Examiner*—Ahmed Elallam
(74) *Attorney, Agent, or Firm*—Burns, Doane, Swecker & Mathis, LLP

(57) ABSTRACT

A switch of high-speed performance can be realized not by software processing but by hardware. A control unit (110) of an NIU ($50_1$) extracts destination information (12) from a received data, and associates the destination information (12) with transfer information (13) in accordance with a table (10) to determine a line to which data is transferred. Then, the data is transferred via a bus (91) to a buffer region (81) to be temporarily stored. After transferring the data, the control unit (110) writes the information that the data to be transmitted is stored in the buffer region (81) into a cue ($6_{13}$), along with a pointer to an address of the data in the buffer region (81). An NIU ($50_3$) appropriately checks the cues ($6_{13}$) through ($6_{43}$). When there is data to be transmitted, the NIU ($50_3$) reads out the data from the buffer region (81) on the basis of the pointer in appropriate timing, and transmits it to a line ($3a$).

17 Claims, 9 Drawing Sheets

SWITCH AND SWITCHING METHOD

BACKGROUND OF THE INVENTION

1. Field of the Invention

The present invention is related to a switch used for receiving and transmitting data between lines in information communication systems.

2. Background of the Invention

Major types of the information communication systems, especially LAN such as Ethernet and ATM-LAN, have used a transmission line shared with all terminals. However, increase in quantity of data to be received and transmitted over LAN and increase in the number of terminals connected to LAN have increased the difficulty of obtaining sufficient transmission capacity in LAN of this type. This fact has recently encouraged the use of a LAN switch in systems so that each terminal can use the whole band of the transmission line which is available for transmission thereby solving the above-described problem.

A conventional LAN switch, however, performs data switching on the transmission line by software processing using a processor, so that it is difficult to improve processing capabilities. For example, a bottle neck in a switch device may limit the band for transmission, although, properly considering performance of the transmission line, the full bond is available for transmission.

SUMMARY OF THE INVENTION

A first aspect of the present invention is related to a switch comprising: a first unit for receiving data from a first line from which data is sent, and recognizing a second line to which data is sent on the basis of the received data; a buffer region shared with the first and second lines, for storing the data received from the first line; a register for storing information related to an address of the data stored in the buffer region and the lines from and to which the data is sent; and a second unit for reading out the data from the buffer region in accordance with the information and transmitting the data to the second line.

Preferably, according to a second aspect of the present invention, the buffer region is formed in a first memory region connected to each of the first and second units via a first bus; and the register is formed in a second memory region, different from the first memory region, connected to each of the first and second units via a second bus different from the first bus.

Preferably, according to a third aspect of the present invention, the second memory region is formed in the first and second units, respectively; and the information is transferred via a signal line connecting the first and second units in series.

Preferably, according to a fourth aspect of the present invention, the line from which data is sent consists of a plurality of the lines from which data is sent; and the register, included in the second memory region separately formed in the second unit, holds the information for each of the lines from which data is sent.

Preferably, according to a fifth aspect of the present invention, the second unit and the second line are paired up and the pair consists of a plurality of the pairs; the signal line connects a plurality of the second units in series; and one of the second units transmits the information to the signal line when receiving the information indicating that data is to be sent to the second line corresponding to another of the second units.

Preferably, according to a sixth aspect of the present invention, the second memory region further includes a table for storing destination information and transfer information associated with each other.

Preferably, according to a seventh aspect of the present invention, the data has a fixed length.

Preferably, according to an eighth aspect of the present invention, the data is divided in appropriate size to be stored in the buffer region; and the divided data are controlled in chain.

A ninth aspect of the present invention is related to a switching method comprising the steps of: (a) receiving data from a first line from which data is sent, and recognizing a second line to which data is sent on the basis of the received data; (b) transferring the data to a buffer region shared with the first and second lines; (c) storing information related to an address of the data stored in the buffer region and the lines from and to which data is sent, into a register; and (d) reading out the data from the buffer region in accordance with the information, and transmitting the data to the second line.

In accordance with the first aspect of the present invention, the switch can be structured by hardware. Further, since the buffer region is shared with the first and second lines, copy of data between the first and second units is unnecessary, realizing high-speed switching. Furthermore, stored in the register as information, both lines from and to which data is sent can be grasped.

In accordance with the second aspect of the present invention, the first and second memory regions are separately formed and connected to each of the first and second units via the first and second buses, respectively. This relieves difference in speed between the first and second memories, and bottle neck caused by difference in transfer capability between the first and second buses. Further, since the first and second buses are physically different from each other, an optimum bus in width can be adopted for each applied system.

In accordance with the third aspect of the present invention, the information related to an address of data in the buffer region or the like is transferred between units via the serial signal line, so that the number of external terminals connected to each of the first and second units can be reduced.

Further, since the first and second units, connected via the signal lines, and the second memory region are connected via respective buses, bottle neck related to a single bus can be relieved compared to the case where the first and second units share the second memory region and are connected thereto via a single bus.

In accordance with the fourth aspect of the present invention, even if there is a plurality of the lines from which data is sent, the second unit can recognize a line from which data is sent.

In accordance with the fifth aspect of the present invention, even if there is a plurality of the second lines to which data is sent, the information can be transferred to the second unit corresponding to a line to which data is sent. This brings about the same effect of the fourth aspect for the register of the second unit.

In accordance with the sixth aspect of the present invention, the register and the table are formed together in the second memory region, so that the number of external terminals connected to the first and second units can be further reduced.

In accordance with the seventh aspect of the present invention, since the data to be transmitted has a fixed length, a system for storing data into the buffer region can be optimized. This is especially applicable to the ATM-LAN.

In accordance with the eighth aspect of the present invention, even if data to be transmitted has a variable length, a system for storing data into the buffer region can be optimized. This is especially applicable to Ethernet.

In accordance with the ninth aspect of the present invention, since data is switched through the buffer region shared with the first and second lines, copy of data between the first and second units is unnecessary, realizing high-speed switching. Further, the method comprises the step of storing the information related to the lines from and to which data is sent into the register, so that the lines from and to which data is sent can be grasped.

The present invention provides a switch of high-speed performance realized not by software processing but by hardware.

These and other objects, features, aspects and advantages of the present invention will become more apparent from the following detailed description of the present invention when taken in conjunction with the accompanying drawings.

DESCRIPTION OF THE PREFERRED EMBODIMENTS

<First Preferred Embodiment>

Figure 1:
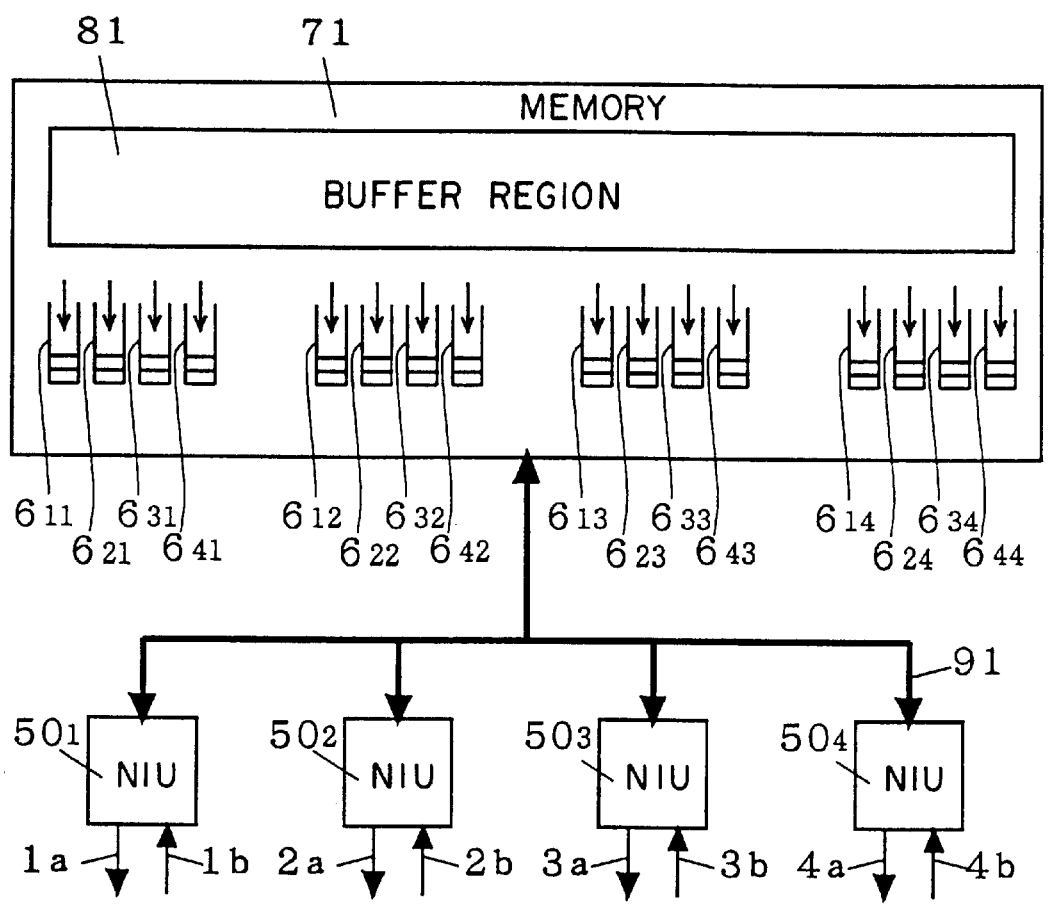
FIG. 1 is a block diagram showing a structure of a switch according to a first preferred embodiment of the present invention.

FIG. 1 shows a structure of a switch with 4×4 lines according to a first preferred embodiment of the present invention. Network Interface Units $50_1$ through $50_4$ (hereinafter referred to as NIU) are connected to terminals (not shown in FIG. 1) via lines 1a through 4a and lines 1b through 4b, respectively, inputting data via the lines 1b through 4b and outputting the data via the lines 1a through 4a. The NIUs $50_1$ through $50_4$ are also connected to a memory 71 via a bus 91. That is, the memory 71 is shared with all the NIUs.

Figure 2:
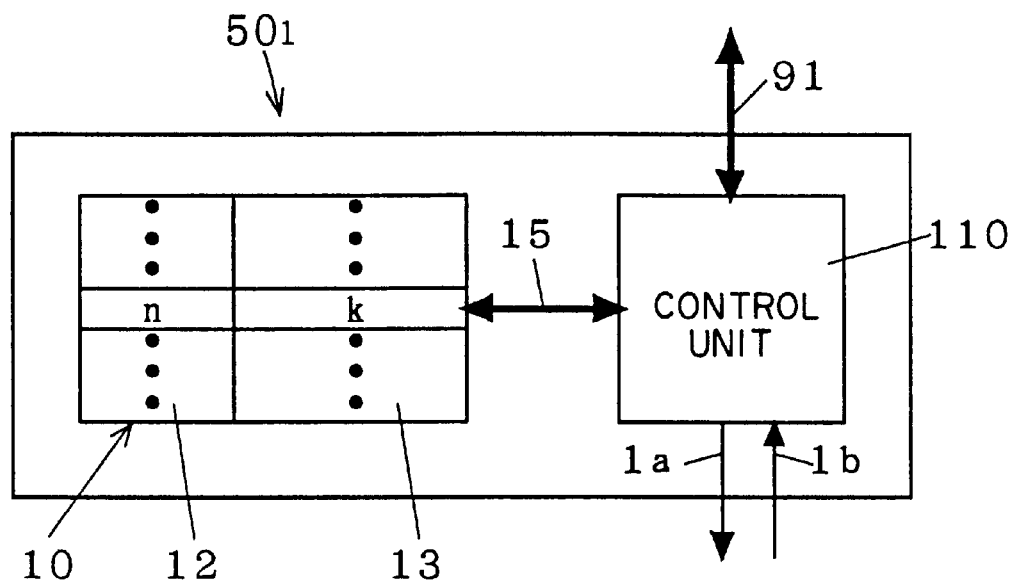
FIG. 2 is a block diagram showing a detailed structure of an NIU $50_1$.

FIG. 2 shows a detailed structure of the NIU $50_1$. The bus 91 and the lines 1a, 1b are connected to a control unit 110. In a table 10 connected via a bus 15 to the control unit 110, destination information 12 and transfer information 13 associated with each other are stored. The destination information n, for example, corresponds to the transfer information k. The NIUs $50_2$ through $50_4$ basically have the same structure as the NIU $50_1$.

Figure 3:
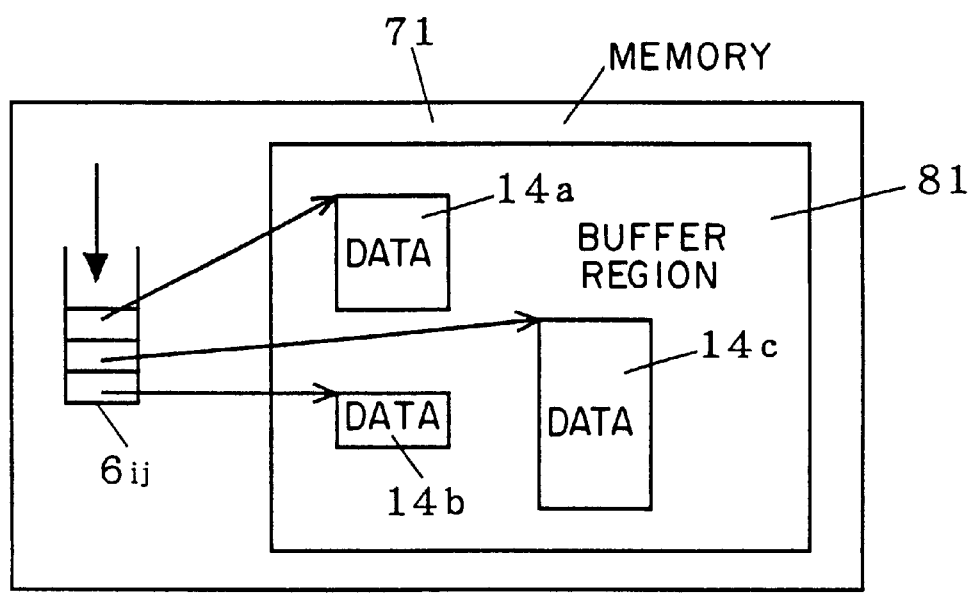
FIG. 3 is a block diagram showing a detailed structure of a memory 71.

FIG. 3 shows a detailed structure of the memory 71. The memory 71 includes a buffer region 81 and cues $6_{11}$ through $6_{44}$ (shown simply as "$6_{ij}$" in FIG. 3). The buffer region 81 temporarily stores data 14a through 14c to be transmitted, and the cue $6_{ij}$ is a register for storing a pointer to an address of each data 14a, 14b, 14c stored in the buffer region 81 as well as other information such as data length. The cue $6_{ij}$ is provided for each combination of lines from and to which data is sent. More specifically, the cue $6_{ij}$ stores a pointer to an address of data transmitted from the line i to the line j along with other information. For example, when data is transmitted from the line 1 to the line 2, the pointer is stored in the cue $6_{12}$ with other information.

Operation of data transmitted from the line 1b to the line 3a will be described in detail with reference to FIGS. 1 through 3. First, data to be transmitted is inputted from a terminal (not shown in FIG. 1) via the line 1b into the control unit 110 of the NIU $50_1$. The control unit 110 extracts the destination information 12 from the data, and associates the destination information 12 with the transfer information 13 in accordance with the table 10 to determine a line to which data is transmitted. Then, the control unit 110 transfers the data via the bus 91 to the buffer region 81 to be temporarily stored. After transferring the data to the buffer region 81, the control unit 110 writes the information that the data to be transmitted is stored in the buffer region 81 into the cue $6_{13}$ along with the pointer to the address of the data in the buffer region 81. In this case, the information is written into the cue $6_{13}$ because the data is transmitted from the line 1b to the line 3a. When data is transmitted to the line 1a, 2a or 4a, the information is written into the cues $6_{11}$, $6_{12}$, or $6_{14}$, respectively. The NIU $50_3$ appropriately checks conditions of the cues $6_{13}$ through $6_{43}$. When there is data to be transmitted, the NIU $50_3$ reads out the data from the buffer region 81 on the basis of the pointer in appropriate timing, and transmits it to the line 3a.

Therefore, according to the first preferred embodiment, the switch can be realized by hardware. Further, since all the NIUs $50_1$ through $50_4$ share the buffer region 81, copy of data between the NIUs is unnecessary, realizing high-speed switching. Furthermore, since the cues $6_{11}$ through $6_{44}$ are separately provided for each combination of lines, the lines from and to which data is sent can be grasped, which is especially practical for LAN.

<Second Preferred Embodiment>

Figure 4:
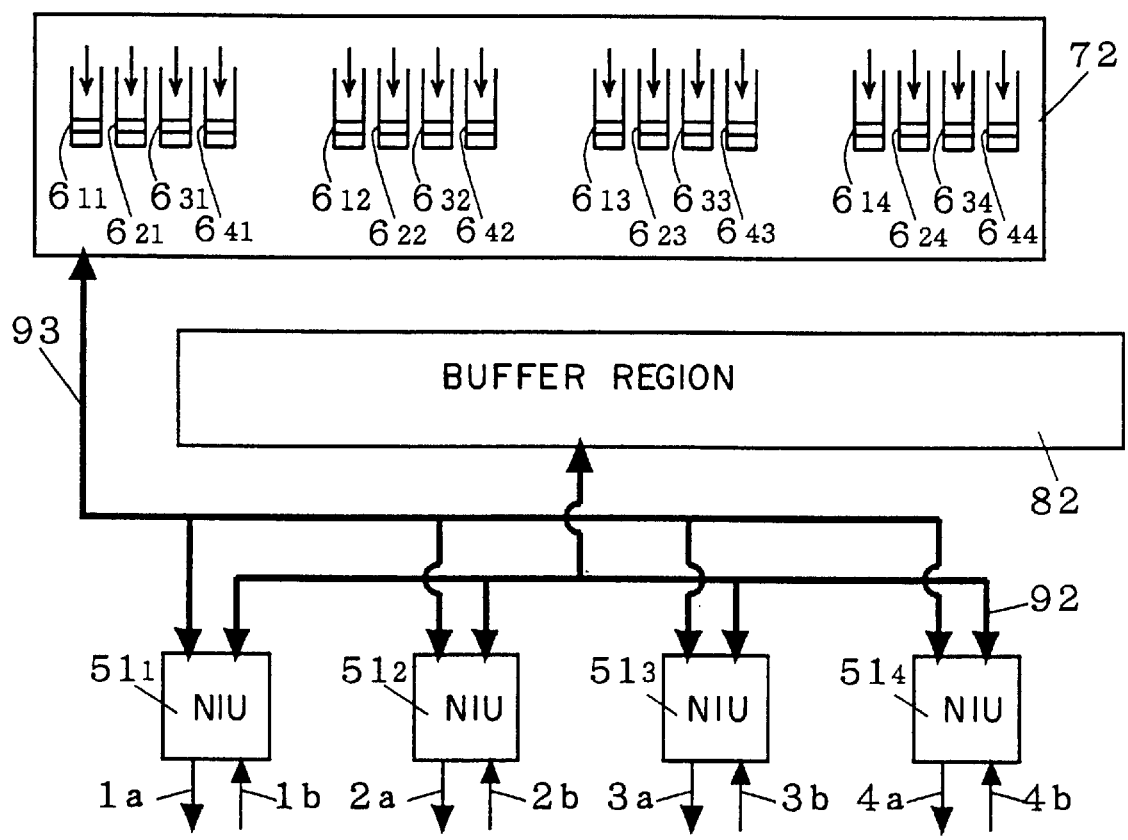
FIG. 4 is a block diagram showing a structure of a switch according to a second preferred embodiment of the present invention.

FIG. 4 shows a structure of a switch according to a second preferred embodiment of the present invention. The detail will be described below, especially pointing out the differences from the first preferred embodiment.

The first difference is that a buffer region 82 and the cues $6_{11}$ through $6_{44}$ are separately formed in different memories according to the second preferred embodiment, while the buffer region 81 and the cues $6_{11}$ through $6_{44}$ are formed in the same memory 71 according to the first preferred embodiment. In the switch of the second preferred embodiment, the buffer region 82 for temporarily storing data to be transmitted, and a memory 72 including the cues $6_{11}$ through $6_{44}$ are connected to the NIUs $51_1$ through $51_4$ via buses 92 and 93, respectively.

Figure 5:
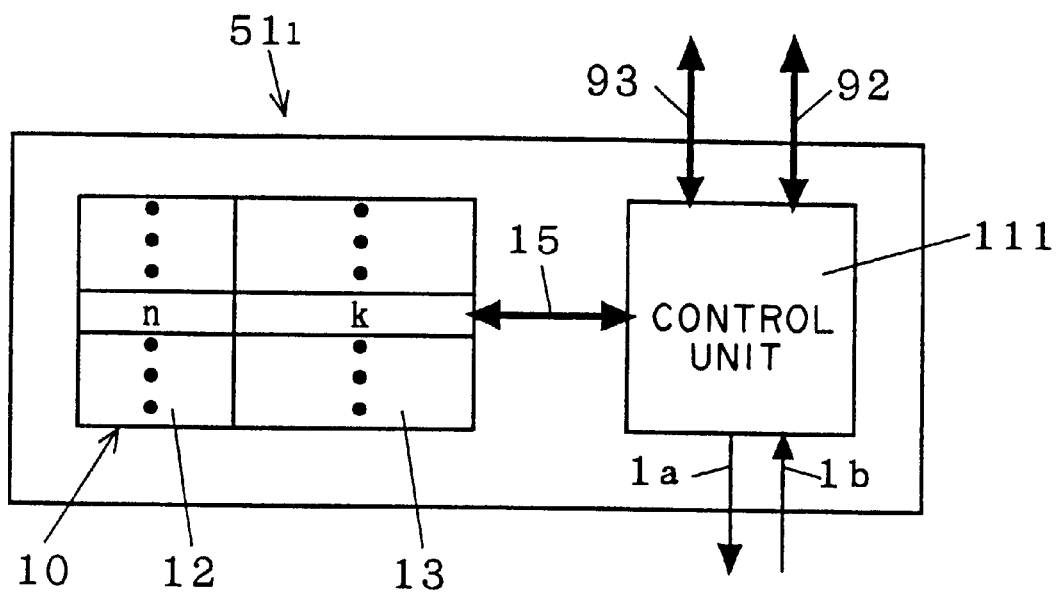
FIG. 5 is a block diagram showing a detailed structure of an NIU $51_1$.

Another difference is that the number of external terminals connected to the control unit of each NIU is increased by connecting the buffer region 82 and the memory 72 to the NIUs $51_1$ through $51_4$ via the buses 92, 93, respectively. FIG. 5 shows a detailed structure of the NIU $51_1$. Besides the lines 1a, 1b and the buses 15, 92, another bus 93 is connected to a control unit 111. Thus, the control unit 111 of the second preferred embodiment shown in FIG. 5 has one more external terminal, the bus 93, compared to the control unit 110 of the first preferred embodiment shown in FIG. 2. The same applies to the control units of the NIUs $51_2$ through $51_4$.

Figure 6:
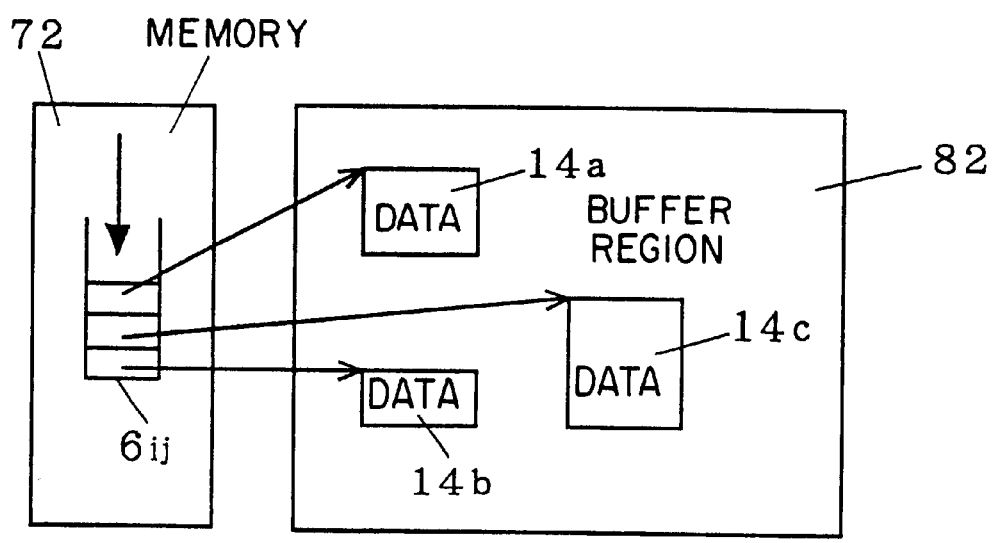
FIG. 6 is a block diagram illustrating correlation between data 14a through 14c stored in a buffer region 82 and a cue $6_{ij}$ formed in a memory 72.

FIG. 6 illustrates correlation between the data 14a through 14c stored in the buffer region 82 and the cue $6_{ij}$ formed in the memory 72. Though the buffer region 82 and the memory 72 are separately formed as described above, a pointer to an address of each data 14a, 14b, 14c in the buffer region 82 is stored in the cue $6_{ij}$ along with other information such as data length, as is the case with the first preferred embodiment.

Now, operation of data transmitted from the line 1b to the line 3a will be described in detail with reference to FIGS. 4 through 6, especially pointing out the differences from the first preferred embodiment. First, data to be transmitted is inputted from a terminal (not shown in FIG. 4) via the line 1b into the control unit 111. The control unit 111 determines a line to which data is sent on the basis of the destination information 12 extracted from the inputted data, and transfers the data via the bus 92 to the buffer region 82. After transferring the data to the buffer region 82, the control unit 111 writes the information that the data to be transmitted is stored in the buffer region 82 into the cue $6_{13}$, along with a pointer to the address of the data in the buffer region 82, via the bus 93. The NIU $51_3$ appropriately checks the cues $6_{13}$ through $6_{43}$. When there is data to be transmitted, the NIU $51_3$ reads out the data from the buffer region 82 on the basis of the pointer in appropriate timing, and transfers it to the line 3a.

Thus, in the switch of the second preferred embodiment, the buffer region 82 and the memory 72, or the bus 92 and the bus 93 are separately formed, respectively, so that difference in speed between the buffer region 82 and the memory 72 or bottle neck caused by difference in transfer capability between the buses 92 and 93 can be relieved, realizing further high-speed switching. Moreover, as the buses 92 and 93 are physically different from each other, an optimum bus in width can be adopted for each applied system.

<Third Preferred Embodiment>

In the second preferred embodiment, the number of external terminals connected to the control unit of each NIU is increased, compared to the switch of the first preferred embodiment, by connecting the buffer region 82 and the memory 72 to the NIUs $51_1$ through $51_4$ via the buses 92 and 93, respectively. For cost reduction, it is further desirable to reduce the number of the external terminals.

Figure 7:
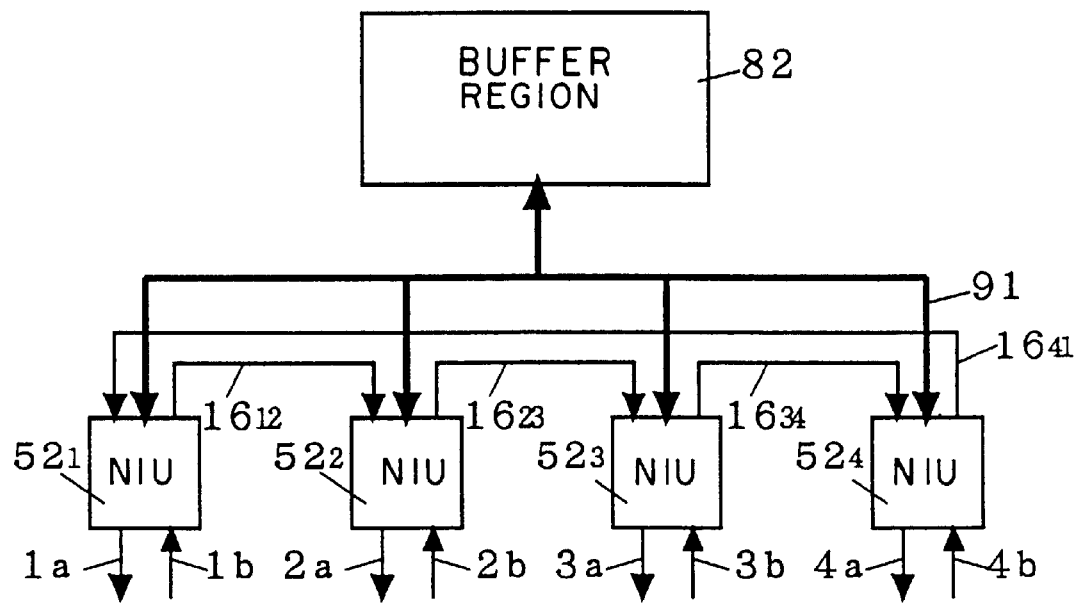
FIG. 7 is a block diagram showing a structure of a switch according to a third preferred embodiment of the present invention.
Figure 8:
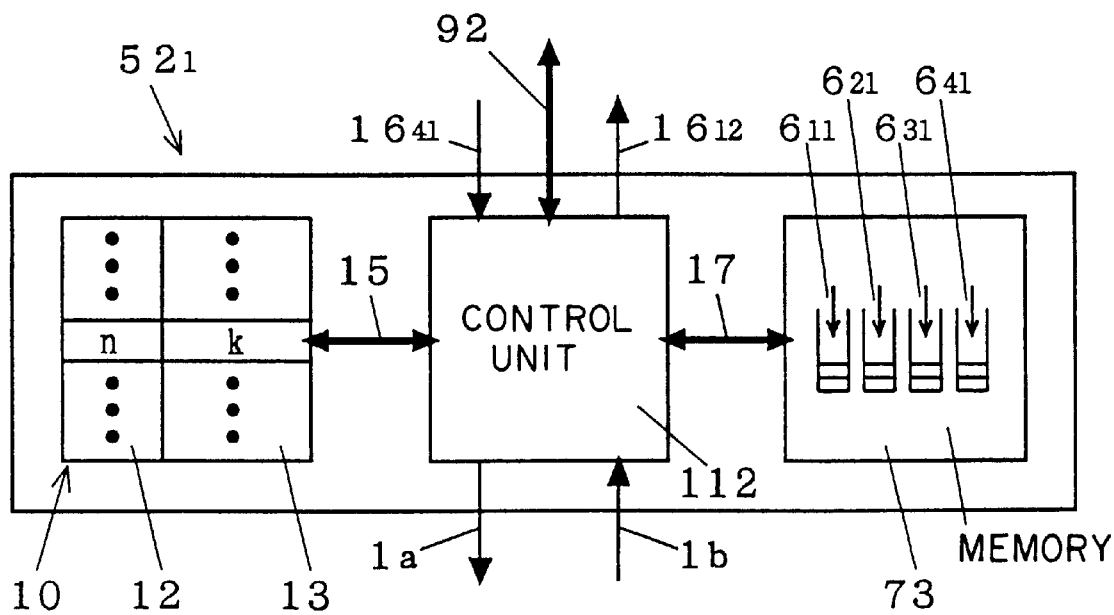
FIG. 8 is a block diagram showing a detailed structure of an NIU $52_1$.

FIG. 7 shows a structure of a switch according to a third preferred embodiment of the present invention, and FIG. 8 shows a detailed structure of an NIU $52_1$. Here, the structures of NIUs $52_2$ through $52_4$ are basically the same as the NIU $52_1$. The switch of the third preferred embodiment is different from that of the second preferred embodiment in the following points. First, each of the NIUs $52_1$ through $52_4$ of the third preferred embodiment has a memory 73 including the cues $6_{11}$ through $6_{44}$ and individually controls the cues $6_{11}$ through $6_{44}$, while the NIU $51_1$ through $51_4$ of the second preferred embodiment are connected via the bus 93 to the memory 72 including the cues $6_{11}$ through $6_{44}$. Secondly, the information that data to be transmitted is stored in the buffer region 82 or the information related to an address of data in the buffer region 82 are transferred via serial signal lines $16_{12}$ through $16_{41}$ between the NIUs.

Now, operation of data transmitted from the line 1b to the line 3a will be described in detail with reference to FIGS. 7 and 8, especially pointing difference from the second preferred embodiment. Data to be transmitted is inputted via the line 1b into a control unit 112. The control unit 112 determines a line to which data is sent on the basis of the destination information 12 extracted from the inputted data, and transfers the data via the bus 92 to the buffer region 82.

After transferring the data to the buffer region 82, the control unit 112 transfers the information that the data to be transmitted is stored in the buffer region 82 via the signal line $16_{12}$ to the NIU $52_2$, along with a pointer to the address of the data in the buffer region 82. The NIU $52_2$ determines whether the data is sent to the line 2a or not on the basis of the transferred information. When the data is to be sent to the line 2a, the information is stored in either of the cues $6_{12}$ through $6_{42}$, depending on the line from which the data is inputted. When the data is not to be sent to the line 2a, the information is transferred via the signal line $16_{23}$ to the NIU $52_3$. In this example, the data is assumed to be sent to the line 3a, so that the information is transferred to the NIU $52_3$.

The NIU $52_3$ performs the same processing as the NIU $52_2$. In this example, the data is assumed to be transmitted from the line 1b to the line 3a, so that the transferred information is stored via the bus 17 to the cue $6_{13}$ (not shown in FIGS. 7 and 8).

The control unit 112 of the NIU $52_3$ appropriately checks conditions of the cues $6_{13}$ through $6_{43}$. When there is data to be transmitted, the control unit 112 reads out the data from the buffer region 82 in appropriate timing on the basis of the pointer included in the transferred information, and transmits it to the line 3a.

In the switch of the third preferred embodiment, the information that data to be transmitted is stored in the buffer region 82 as well as other information are transferred between the NIUs not via the buses but via the serial signal lines $16_{12}$ through $16_{41}$. Thus, it is unnecessary for the control unit of each NIU to have the bus 93 which requires a lot of external terminals depending on the number of bits in data or the like. Thus, the number of external terminals connected to the control units can be reduced compared to the switch of the second preferred embodiment, realizing cost reduction of the switch.

Moreover, in the switch of the third preferred embodiment, the memory 73 including the cues $6_{11}$ through $6_{44}$ is connected to the control unit of each NIU via the bus 17 which is included in each NIU. Thus, bottle neck related to the bus 93 can be prevented in the third preferred embodiment, compared to the second preferred embodiment in which the memory 72 including the cues $6_{11}$ through $6_{44}$ is connected to each NIU via the bus 93 shared with all the NIUs.

<Fourth Preferred Embodiment>

The table 10 and the memory 73 separately formed according to the third preferred embodiment can also be formed in one memory.

Figure 9:
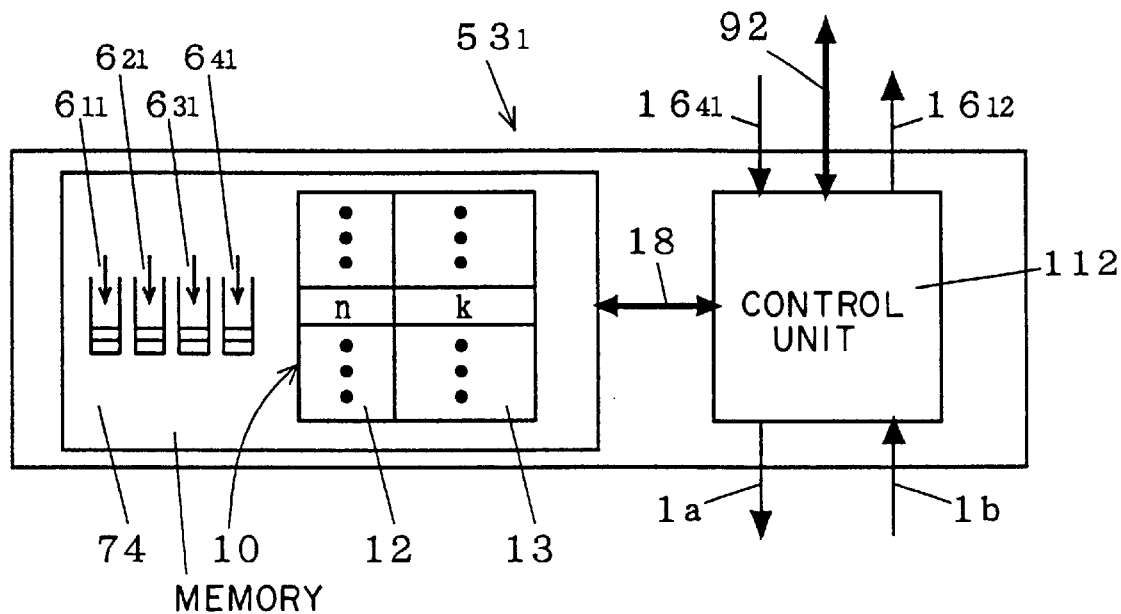
FIG. 9 is a block diagram showing a structure of a switch according to a fourth preferred embodiment of the present invention.

FIG. 9 shows a structure of a switch according to a fourth preferred embodiment of the present invention. Since the switch is basically structured as in the third preferred embodiment, only a detailed structure of an NIU $53_1$ which is different from the NIU $52_1$ of the third preferred embodiment is shown in FIG. 9. NIUs $53_2$ through $53_4$ have the same structure as the NIU $53_1$.

As shown in FIG. 9, a memory 74 connected via a bus 18 to the control unit 112 includes the table 10 and the cues $6_{11}$ through $6_{41}$. That is, while the table 10 and the memory 73 are separately formed in the third preferred embodiment, they are formed together in the fourth preferred embodiment as the memory 74 and connected to the control unit 112 via only the bus 18.

Figure 10:
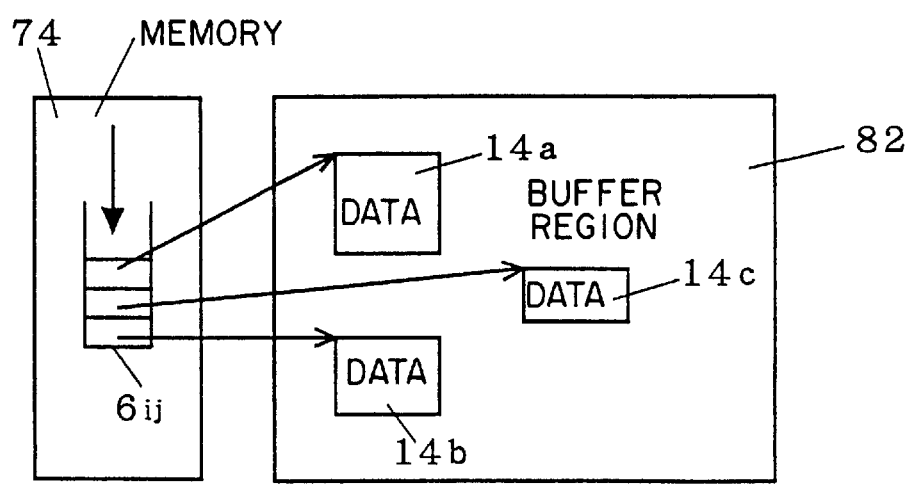
FIG. 10 is a block diagram illustrating correlation between the data 14a through 14c stored in the buffer region 82 and the cue $6_{ij}$ formed in a memory 74.

FIG. 10 shows correlation between the data 14a through 14c stored in the buffer region 82 and the cue $6_{ij}$ formed in the memory 74. Though the buffer region 82 and the memory 74 are separately formed in the fourth preferred embodiment, a pointer to an address of each data 14a, 14b, 14c in the buffer region 82 is stored in the cue $6_{ij}$ along with other information such as data length, as described in the first preferred embodiment.

In the switch of the fourth preferred embodiment, the cues $6_{11}$ through $6_{41}$ and the table 10 are formed together in the memory 74, so that the number of external terminals connected the control unit 112, in this case, the bus 17, can be reduced compared to the third preferred embodiment in which the cues $6_{11}$ through $6_{41}$ and the table 10 are separately formed and connected to the control unit 112 via the buses 17 and 15, respectively. This results in reduction in and optimization of memory, realizing further cost reduction of the switch.

<Fifth Preferred Embodiment>

In a fifth preferred embodiment, the switch according to the first preferred embodiment is applied to an asynchronous transfer mode LAN (ATM-LAN).

Figure 11:
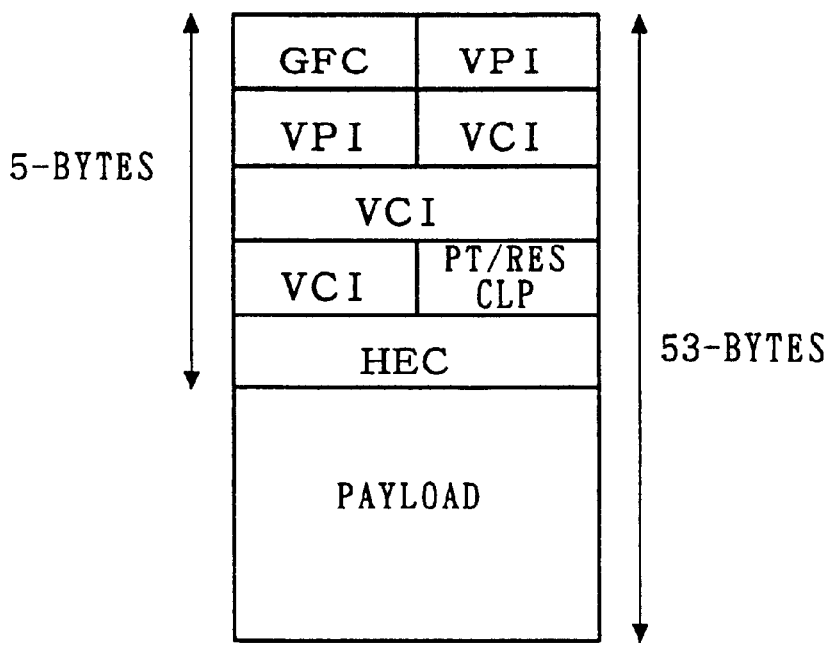
FIG. 11 shows a format of an ATM cell 19.

FIG. 11 shows a format of an ATM cell 19 prescribed by the recommendation I.432 etc. of the ITU-T. The ATM-LAN employs the ATM cell 19 with a fixed length of 53 bytes as a unit for receiving and transmitting data, and performs switching in this unit. Further, VPI (virtual pass identifier) and VCI (virtual channel identifier) included in a 5-byte header of the ATM-LAN correspond to the destination information 12 shown in FIG. 2. Thus, the control unit 110 extracts the VPI/VCI from the ATM cell 19 inputted from the line 1b, and determines a line to which data is sent on the basis of the transfer information 13 obtained by retrieval of the table 10.

Figure 12:
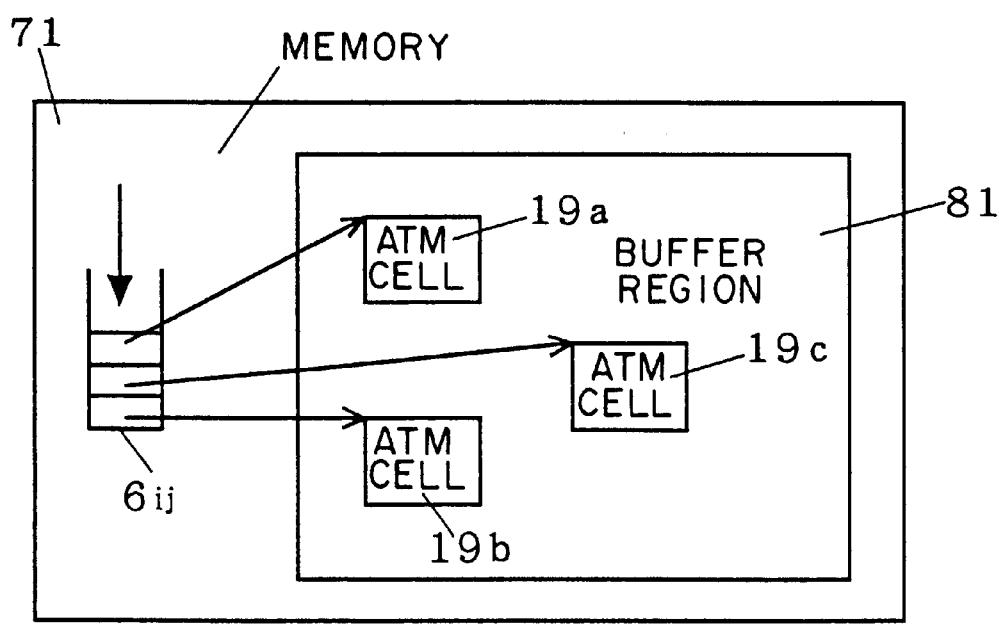
FIG. 12 is a block diagram showing a detailed structure of the memory 71.

FIG. 12 shows a detailed structure of the memory 71. ATM cells 19a through 19c to be transmitted are temporarily stored in the buffer region 81 formed in the memory 71, and a pointer to an address of each ATM cell 19a, 19b, 19c in the buffer region 81 is stored in the cue $6_{ij}$ along with other information. Since data is received or transmitted in a unit of 53 bytes, the ATM cells 19a through 19c in the buffer region 81 are all the same in size as shown in FIG. 12.

In this way, the switch of the first preferred embodiment is applicable to the ATM-LAN. That is, high-speed switch for the ATM-LAN can be realized by hardware. Further, since the ATM cells 19a through 19c in the buffer region 81 are all the same in size, a system for storing data into the buffer region 81 can be optimized and further data length can be deleted from information to be stored in the cue $6_{ij}$.

Though only the switch of the first preferred embodiment is applied to the ATM-LAN as an example in the above description, the switches of the second through fourth preferred embodiments are also applicable.

<Sixth Preferred Embodiment>

In a sixth preferred embodiment, the switch according to the first preferred embodiment is applied to Ethernet, a bus-type LAN in a CSMA/CD (carrier sense multiple access with collision detection) mode.

Figure 13:
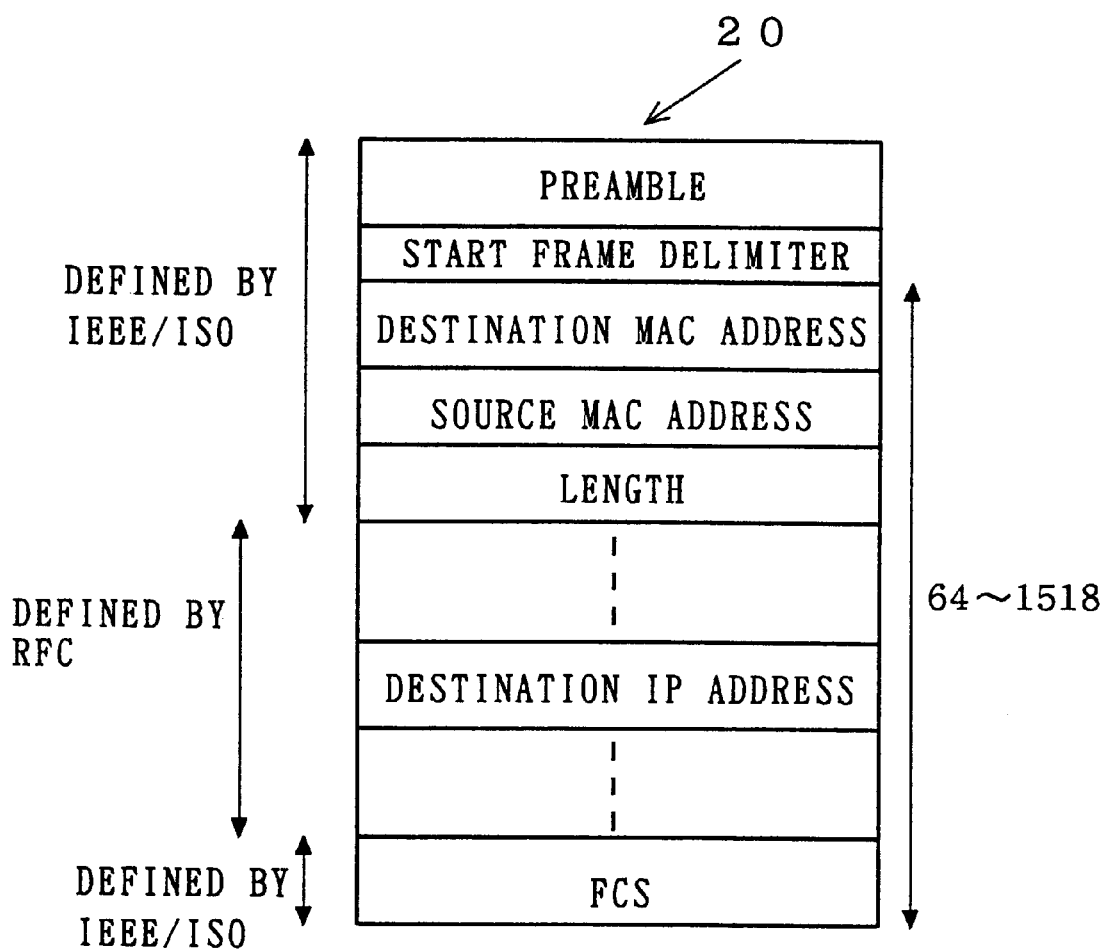
FIG. 13 shows a format of a frame 20 for Ethernet.

FIG. 13 shows a format of a frame 20 for Ethernet prescribed by the IEEE 802.3 et al. Ethernet employs the variable-length frame 20 ranging from 64 to 1518 bytes as a unit for receiving and transmitting data, and performs switching in this unit. Further, a parameter of Destination IP Address in Ethernet corresponds to the destination information 12 shown in FIG. 2. Thus, the control unit 110 extracts the "Destination IP Address" from the frame 20 for Ethernet inputted from the line 1b and determines a line to which data is sent on the basis of the transfer information 13 obtained by retrieval of the table 10.

Figure 14:
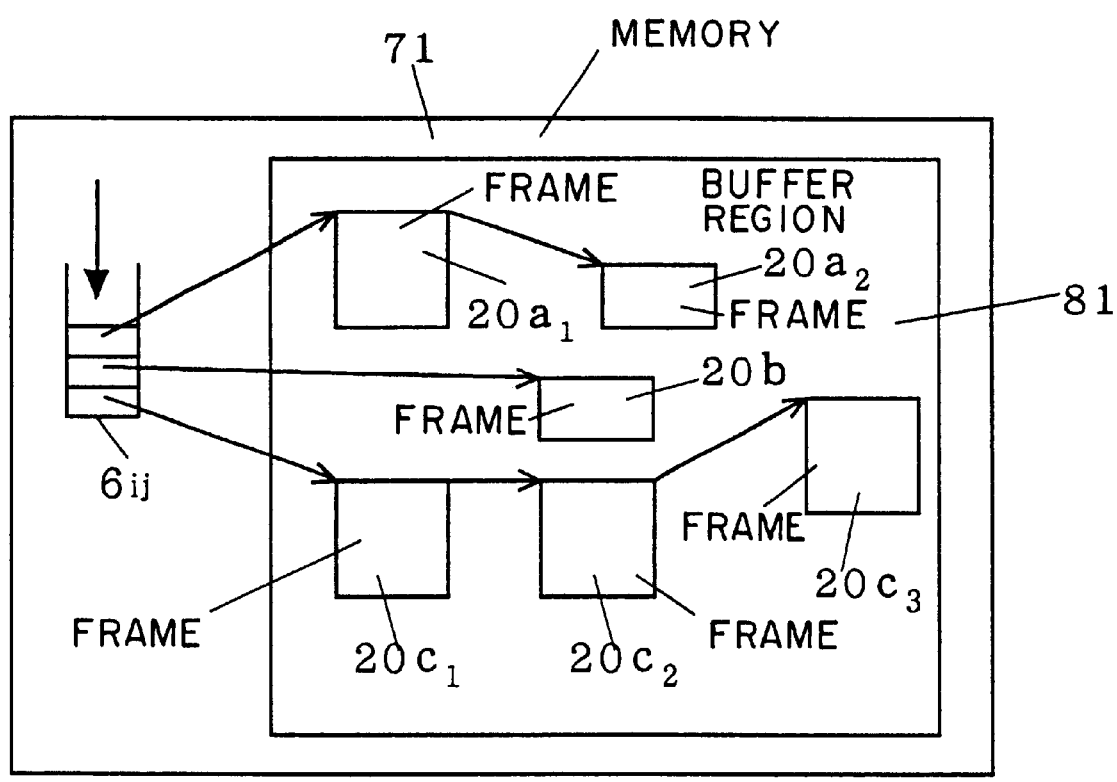
FIG. 14 is a block diagram showing a detailed structure of the memory 71.

FIG. 14 shows a detailed structure of the memory 71. Though Ethernet employs the variable-length frame as a unit for receiving and transmitting data, it is not desirable to use the buffer region 81 to its maximum length, considering efficiency of the memory 71. Therefore, each frame is divided in appropriate size and controlled as a chain of data as shown in FIG. 14. That is, frames 20a, 20b 20c are divided depending on its length into frames $20a_1$, $20a_2$, frame 20b, and frames $20c_1$ through $20c_3$, respectively, to be stored in the buffer region 81. Then, a pointer to the head end of each frame 20a, 20b, 20c is stored in the cue $6_{ij}$ along with other information such as data length.

In this way, the switch of the first preferred embodiment is also applicable to Ethernet. That is, high-speed switch for Ethernet can be realized by hardware.

Further, each frame is divided into appropriate size in order to adjust to Ethernet characteristics that data is received or transmitted in variable units, and those divided data are controlled in chain. This optimizes a system for storing data into the buffer region 81.

Though only the switch of the first preferred embodiment is applied to Ethernet as an example in the above description, the switches of the second through fourth preferred embodiments are also applicable.

While the invention has been described in detail, the foregoing description is in all aspects illustrative and not restrictive. It is understood that numerous other modifications and variations can be devised without departing from the scope of the invention.

I claim:

1. A switch comprising:
   a first unit for receiving data from a first line from which data is sent, and for recognizing a second line to which data is sent on the basis of said received data;
   a buffer region shared with said first and second lines, for storing said data received from said first line;
   registers for storing information related to an address of said data stored in said buffer region, each register being for a combination of said lines from and to which said data is sent; and
   a second unit for reading out said data from said buffer region in accordance with said information and for transmitting said data to said second line.

2. The switch of claim 1, wherein
said buffer region is formed in a first memory region connected to each of said first and second units via a first bus; and
said registers are formed in a second memory region, different from said first memory region, connected to each of said first and second units via a second bus different from said first bus.

3. The switch of claim 1, wherein
said buffer region is connected to each of said first and second units via a bus, and
a first group of said registers is included in said first unit and a second group of said registers is included in said second unit, said information is transferred via a signal line connecting said first and second units in series.

4. The switch of claim 3, wherein registers included in said second group are correspondingly provided to a plurality of lines from which data are sent, one of said plurality of lines being said first line, the each register of said second group holding said information for the corresponding line.

5. The switch of claim 4, further comprising:
a plurality of third units connected to a plurality of lines to which data are sent, said plurality of third units including said second unit, said plurality of third units each including a part of said registers,
said signal line connects a plurality of said third units in series, and
one of said plurality of third units transmits said information to said signal line when receiving said information indicating that data is to be sent to a line to which another of said plurality of third units is connected.

6. The switch of claim 4, wherein each of said first and second units includes a table for storing destination information and transfer information associated with each other.

7. The switch of claim 1, wherein each of said registers is a cue for reading out said information in order stored.

8. The switch of claim 1, wherein said data has a fixed length.

9. The switch of claim 8, said switch being applicable to an ATM-LAN.

10. The switch of claim 1, wherein
said data is divided in appropriate size to be stored in said buffer region; and
said divided data are controlled in chain.

11. The switch of claim 10, said switch being applicable to a bus-type LAN in a CSMA/CD mode.

12. A switching method comprising the steps of:
(a) receiving data from a first line from which data is sent, and recognizing a second line to which data is sent on the basis of said received data;
(b) transferring said data to a buffer region shared with said first and second lines;
(c) storing information related to an address of said data stored in said buffer region for each combination of said lines from and to which data is sent, into a register; and
(d) reading out said data from said buffer region in accordance with said information, and transmitting said data to said second line.

13. The switching method of claim 12, wherein said data has a fixed length.

14. The switching method of claim 13, said switching method being applicable to an ATM-LAN.

15. The switching method of claim 12, wherein
said data is divided in appropriate size to be stored in said buffer region; and
said divided data are controlled in chain.

16. The switching method of claim 15, wherein said switching method being applicable to a bus-type LAN in a CSMA/CD mode.

17. A switch comprising:
a plurality of control units respectively connected to first lines from which data are sent, and respectively connected to second lines to which data are sent, each control unit for determining one of the second lines in accordance with information included in data received from the first line connected thereto,
a buffer region connected to said plurality of control units, for storing data transferred through each of the first lines, and
registers provided correspondingly to pairs of ones of the first lines and ones of the second lines, respectively, for storing addresses of said buffer region, the data being read out from said buffer region in accordance with the addresses of said registers, wherein
each control unit controls to write an address, where the received data is stored, into one of registers corresponding to a pair of the first line connected thereto and the determined second line.

* * * * *